US009001385B2

(12) United States Patent
Hirakawa (10) Patent No.: US 9,001,385 B2
(45) Date of Patent: Apr. 7, 2015

(54) PRINTER DRIVER AND IMAGE FORMING APPARATUS

(71) Applicant: Canon Kabushiki Kaisha, Tokyo (JP)

(72) Inventor: Satoshi Hirakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/863,880

(22) Filed: Apr. 16, 2013

(65) Prior Publication Data

US 2013/0222825 A1 Aug. 29, 2013

Related U.S. Application Data

(62) Division of application No. 12/365,480, filed on Feb. 4, 2009, now Pat. No. 8,441,667.

(30) Foreign Application Priority Data

Feb. 7, 2008 (JP) ................................ 2008-027698

(51) Int. Cl.
*G06K 15/02* (2006.01)
*H04N 1/387* (2006.01)
*G06F 3/12* (2006.01)

(52) U.S. Cl.
CPC ............ *G06K 15/188* (2013.01); *H04N 1/3871* (2013.01); *G06F 3/1208* (2013.01); *G06F 3/1243* (2013.01); *G06F 3/1285* (2013.01)

(58) Field of Classification Search
CPC ... G06F 3/1208; G06F 3/1243; G06F 3/1285; G06F 15/188; G06F 3/1205; G06F 3/1258; G06F 3/1219; G06F 17/212; G06F 17/218; G06F 3/1253; G06F 3/1255; G06F 3/1237; H04N 1/32144; H04N 1/32309; H04N 1/00432; H04N 1/00973; H04N 2201/3271

USPC ..................................................... 358/1.1, 1.9
See application file for complete search history.

(56) References Cited

U.S. PATENT DOCUMENTS 5,687,332 A * 11/1997 Kurahashi et al. ............ 715/706
7,239,418 B2   7/2007 Mori
(Continued)

FOREIGN PATENT DOCUMENTS

JP           8-274969 A    10/1996
JP           2003-244422     8/2003
(Continued)

OTHER PUBLICATIONS

Japanese Office Action dated Aug. 7, 2012 in JP Application No. 2011-024148.
Japanese Office Action dated Dec. 2, 2011 in Japanese Application No. 2008-027698.
Japanese Office Action dated Apr. 13, 2012 in JP Application No. 2011-024148.
(Continued)

*Primary Examiner* — King Poon
*Assistant Examiner* — Iriana Cruz
(74) *Attorney, Agent, or Firm* — Fitzpatrick, Cella, Harper & Scinto (57) ABSTRACT

A printer driver and an image forming apparatus for appropriately combining additional information (such as a stamp) and an original to print the combined image data. The printer driver according to one embodiment of the present invention, relates to a printer driver connected to a printer for registering form data transmitted from the printer driver, and for combining the registered form data and contents data. The printer driver transmits transparent data as form data and a command indicating that the form data is transparent data, to the printer.

7 Claims, 9 Drawing Sheets

(56) References Cited

U.S. PATENT DOCUMENTS

2005/0078993 A1* 4/2005 Oomura et al. ............... 399/366
2007/0216924 A1* 9/2007 Watanabe ..................... 358/1.9
2011/0090521 A1 4/2011 Ohta et al.

FOREIGN PATENT DOCUMENTS

| JP | 2006-251389 A | 9/2006 |
| JP | 2006-309685 A | 11/2006 |
| JP | 2007-125852 A | 5/2007 |

* cited by examiner

PRINTER DRIVER AND IMAGE FORMING APPARATUS

This application is a divisional of U.S. application Ser. No. 12/365,480, filed Feb. 4, 2009 (allowed), the contents of which are incorporated by reference herein.

BACKGROUND OF THE INVENTION

1. Field of the Invention

The present invention relates to a printer driver and an image forming apparatus, more specifically, relates to a printer driver and an image forming apparatus for performing printing using a transparent toner and a transparent ink.

2. Description of the Related Art

Conventionally, as processing for adding additional information to contents data, various methods have been suggested. For example, in Japanese Patent Laid-Open No. 2003-244422, processing regarding to adding a stamp to contents data is disclosed, in which visibility of the stamping information is enhanced by making a print with a stamp color to be provided as a complementary color of the contents data to be overwritten.

That is, in Japanese Patent Laid-Open No. 2003-244422, when a digital copier combines an original read by a scanner of the copier with a stamp such as a page number, and outputs the combined original, the color of the stamp is set to be a color complementary to the color of the area of the original, on which the stamp is combined.

However, in the technology disclosed in Japanese Patent Laid-Open No. 2003-244422, in some cases, the color designation selected by a user, may be automatically changed involuntarily. Moreover, since the color of the contents data on which a stamp as additional information is overwritten is not always a plain color, in some contents data, it may be difficult to see the additional information on the contrary.

SUMMARY OF THE INVENTION

The present invention provides a printer driver and an image forming apparatus for appropriately combining additional information (such as a stamp) and an original to print the combined original.

The present invention is an information processing apparatus connected to an image forming apparatus which registers form data transmitted from the information processing apparatus and combines the registered form data with contents data. The image forming apparatus comprises a function for transmitting transparent-color additional information as form data and a command indicating that the form data is the transparent-color additional information to the image forming apparatus.

The present invention is an information processing apparatus connected to an image forming apparatus which includes a unit for registering form data transmitted from the information processing apparatus and a combination section for combining the registered form data with contents data. The information processing apparatus comprises determination unit for determining the color of additional data. The information processing apparatus transmits the additional data as form data and a command indicating that the form data is transparent-color additional information to the image forming apparatus, when the determination unit determines that the color of the additional data is transparent. The information processing apparatus transmits contents data and the additional data to the image forming apparatus, when the determination unit determines that the color of the additional data is not a transparent color.

The present information is an apparatus comprises a rendering unit for rendering normal-color data, when the color of additional information is a normal color, the rendering unit, by sequentially rendering normal-color contents data and normal-color additional information, combines them each other. When the color of the additional information is a transparent (T) color, the rendering unit renders the normal-color contents data. The apparatus further comprises a combination unit for registering transparent-color additional information as form data, and for combining the registered form data with the rendered normal-color contents data.

According to the present invention, a user can involuntarily switch between usual printing and printing using clear toner, of additional information for contents data through setting on a printer driver UI (user interface), and thereby enabling to improve user's convenience.

Further features of the present invention will become apparent from the following description of exemplary embodiments (with reference to the attached drawings).

DESCRIPTION OF THE EMBODIMENTS

Hereinafter, with reference to appended drawings, a preferable embodiment of the present invention will be described in detail. However, components described in the embodiment are mere examples, and the scope of the present invention is not limited to them.

Hereinafter, with reference to appended drawings, the embodiment of the present invention will be described in detail.

Hereinafter, with reference to appended drawings, the embodiment of the present invention will be described in detail.

According to the present invention, by switching modes of a print control command generated at the side of a printer driver through designation of color of additional information to be added to contents data, switching between usual printing and transparent toner (clear toner) printing or printing using a transparent ink is realized.

With reference to a block diagram in FIG. 1, the configuration of a print control system according to the present embodiment will be described.

In addition, the function of the present invention may be performed by an apparatus composed of a single device or a system composed of a plurality of devices. Moreover, the present invention is applicable to even a system that connects to a host computer through a network such as a LAN (Local Area Network) or a WAN (Wide Area Network) and performs processing.

The print control system according to the present invention is constituted by a host computer 3000 and a printer 1500.

The host computer 3000 that is an information processor includes a CPU 1, a RAM 2, and a ROM 3.

Figure 1:
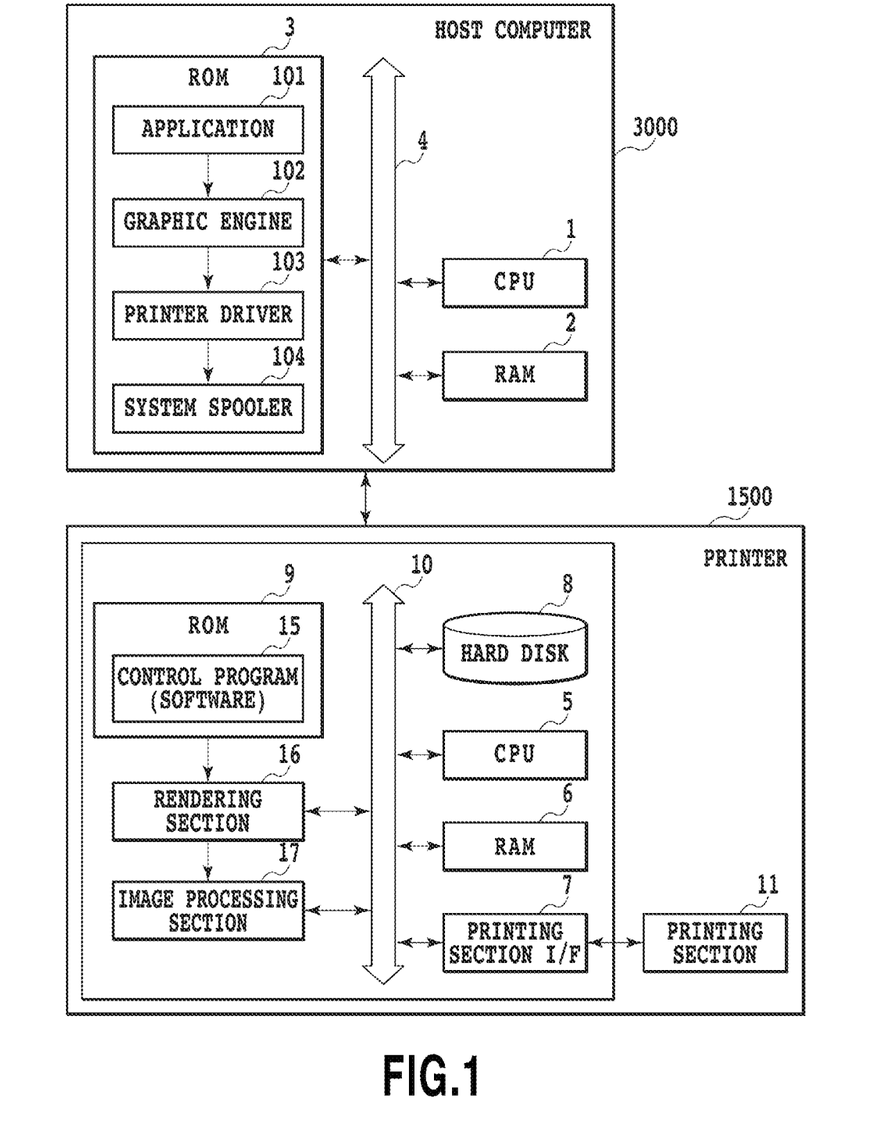
FIG. 1 is an explanatory view of a print control system according to an embodiment of the present invention.

In FIG. 1, the host computer 3000 includes the CPU 1 that executes processing based on various programs (such as programs illustrated in FIG. 4, FIG. 8 and FIG. 9) stored on a program ROM of the ROM 3. The CPU 1 totally controls devices connected to a system bus 4.

The RAM 2 acts as a main memory and a working area etc. of the CPU 1.

Moreover, the host computer 3000 includes: an input operating section (not shown) including a keyboard for inputting a predetermined command or data, or various switches; and a display section (not shown) for displaying various objects such as inputting/setting conditions.

Moreover, the CPU 1 opens various windows registered based on a command directed by a user through an input operating section such as a mouse cursor on a display section such as a CRT, and executes various kinds of data processing. At the time of direction of printing execution, a user can open a window regarding to setting of printing to direct setting of a printer and setting of a printing method to a printer driver including selection of print modes. In addition, as shown in the figure, application 101, a graphic engine 102, a printer driver 103, and a system spooler 104 are programs held on the ROM 3. The CPU 1 reads these programs onto the RAM 2 and executes them to perform various kinds of processing.

In the present embodiment and the following embodiments, for simplicity, description will be performed on the premise that the programs 101 to 104 execute processing as execution subjects. That is, using expression that the application 101 executes processing A, the present embodiment and the following embodiments will be described. In addition, as is clear for those skilled in the art, expression that the application 101 executes processing of A, means that by reading the application 101 from the ROM 3 onto the RAM 2, the CPU 1 executes processing A based on the loaded application 101. This is the same for the graphic engine 102, the printer driver 103, and the system spooler 104, or the below-described control software.

The printer 1500 is controlled by a printer CPU 5.

The printer CPU 5, based on a control program (such as a program illustrated in FIG. 5) stored on a program ROM in a ROM 9, outputs image data on a print section (printer engine) 11 connected to a system bus 10 through a print section I/F 7. Moreover, on the program ROM in the ROM 9, programs such as a control program (software) for the CPU 5 are stored. Moreover, the CPU 5 totally controls devices connected to the system bus 10.

The CPU 5 is designed so as to be communicatable with the host computer 3000, thereby, it can notice information in the printer to the host computer 3000.

A RAM 6 is a RAM acting as the main memory or a working area of the CPU 5. A hard disk 8 acting as a storage unit stores form data etc.

According to the present embodiment, a rendering section 16 is constituted using specific hardware etc. Accordingly, its processing speed is faster than the speed of the control software 15. Moreover, the rendering section 16 combines two pieces of data by rendering them sequentially. On the contrary, in the below described combination using form data (combination by the control software 15), the processing speed is faster than the above case. That is, its combination speed is faster than the combination speed of the case using the control software 15.

This is because in the combination using below-described form data, the following processing is performed. That is, in the combination by the control software 15, procedures of rendering the form data, rendering the contents data, and combining the two pieces of rendered data, are performed. Thus, two times of rendering and one time of combination procedures are performed.

On the contrary, the rendering section 16 performs rendering only by two times (in other words, the rendering and the combination procedure are performed only one time). For this reason, processing speed of the combination using the rendering section 16 is faster than the speed of the combination using the control software 15 by one time of procedure.

On the contrary, the rendering section 16, using the specific hardware etc., can deal only RGB data or CMYK data. Moreover, in the present invention, there is also a fact that "data buses for outputting data from the rendering section 16 to another processing section (such as control software or a RAM) are prepared only for the RGB data or CMYK data".

As mentioned above, although the rendering section 16 according to the present embodiment, is designed to have such an extremely limited configuration, it is possible for those skilled in the art to extend the rendering section 16. However, the rendering section 16 is limited in meaning that it does not (not can not) deal with transparent (T) data. Here, the reason of describing that it does not deal with T data instead that it can not deal with T data, will be described below.

For example, a case may also be possible, in which the rendering section 16 can deal the T data, but do not deal with the T data, because an image processing section 17 connected to rendering section 16 cannot deal with the T data. Since even in this case, the same processing as the processing according to the present embodiment will also be performed, the above mentioned description is used.

Meanwhile, the control software 15 is composed of a group of programs, and at the same time it is a virtual subject occurred when the CPU 5 executes the group of programs. Accordingly, it can be easily extended by designing a new group of programs. For example, it can be easily extended so as to deal with data (such as T data) other than the RGB data or the CMYK data. In addition, in the present embodiment, the control software 15 is extendedly designed so that it can deal with the RGBT data or the CMYKT data.

In addition, herein, "transparent (T) data" is image data for forming an image by adding a material containing no color, such as a transparent toner, or a transparent ink, to a recording medium. Accordingly, by forming an image based on the T data, the transparent toner or the transparent ink is added to the recording medium so as to generate an intended image, and a transparent image (such as a stamp) is formed on the recording medium.

The overlay (combination) printing function of the print control system illustrated in FIG. 1 will be described.

Figure 2:
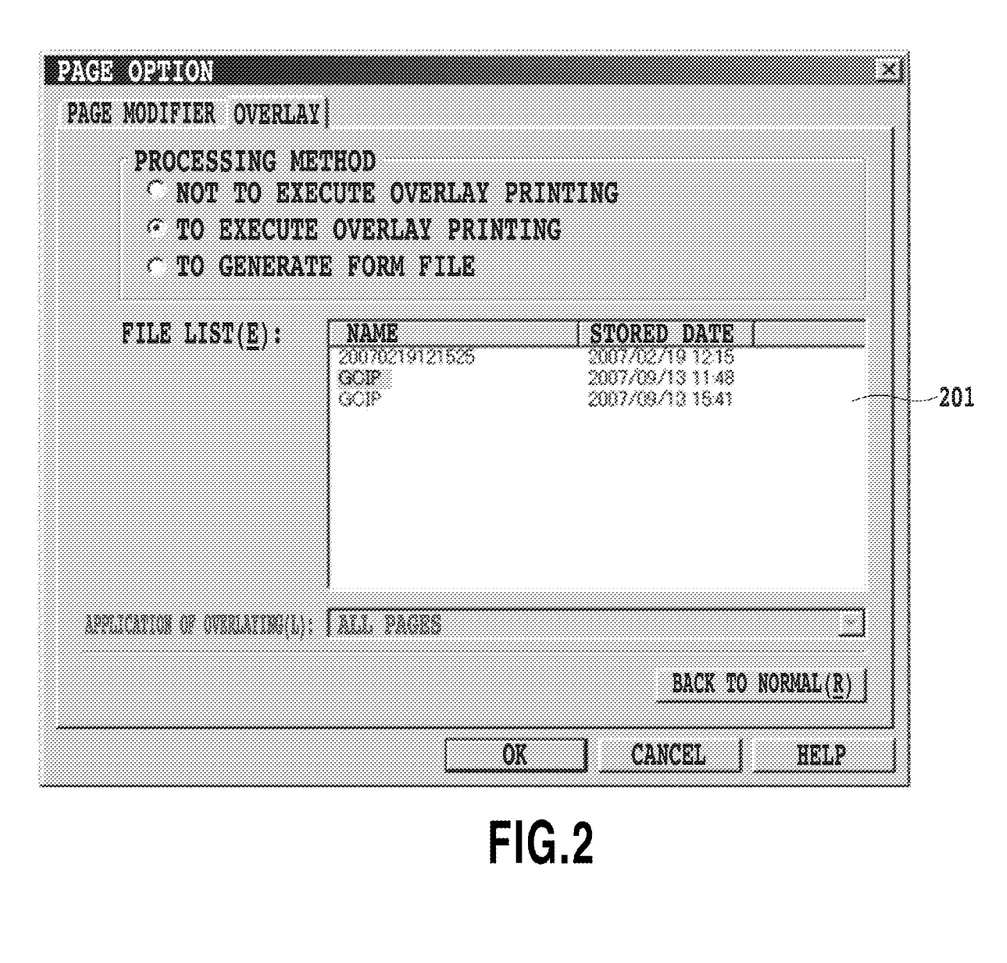
FIG. 2 is an exemplary view of an interface through which setting of overlay printing is executed, according to an embodiment of the present invention.
Figure 3:
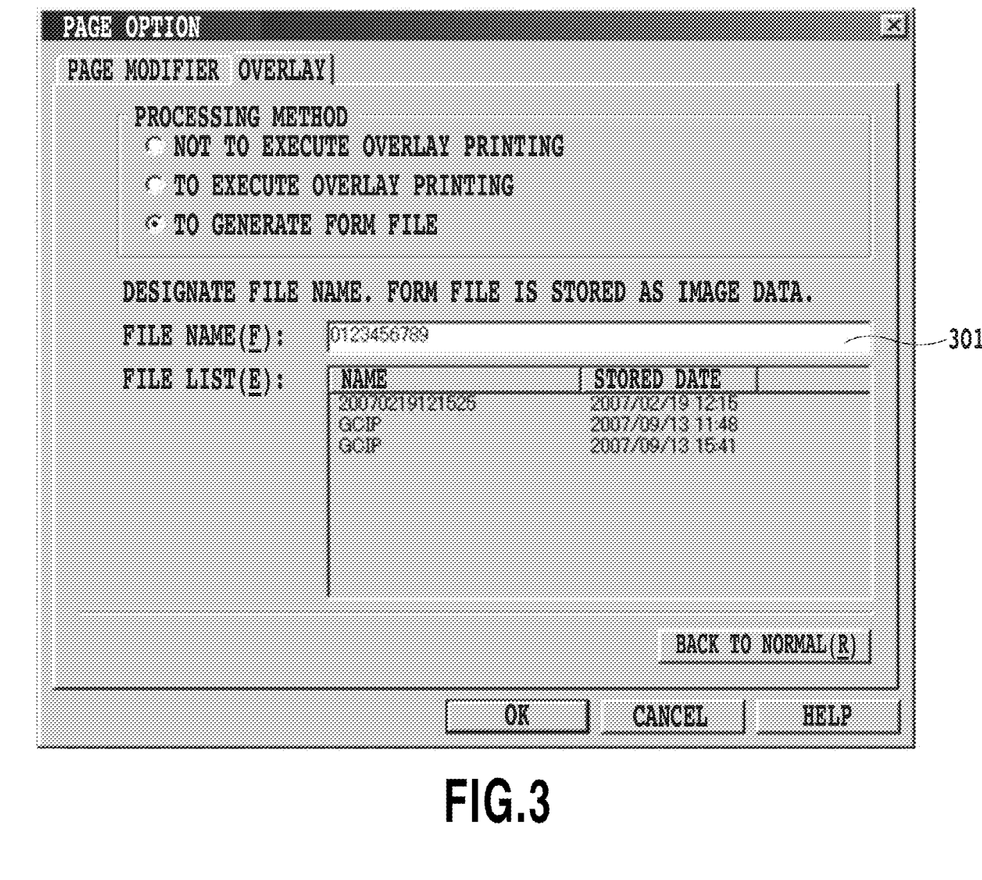
FIG. 3 is another exemplary view of an interface through which setting of overlay printing is executed, according to an embodiment of the present invention.

FIGS. 2 and 3 are examples of interfaces in which setting of overlay printing is input, respectively, and the setting is displayed on the display section of the computer 3000. A user can designate to the control software 15 through the interfaces, "not to execute overlay printing", "to execute overlay printing", or "to generate a form file (form data)". That is, if the user operates the input operating section of the computer 3000 to select a desired operation, the computer 3000 transmits information indicating the selected operation to the printer 1500, and the control software 15 operates based on the information received by the printer 1500.

With reference to FIG. 2, a case of the interface when "to execute overlay printing" is designated is exemplified. If the designation is directed by a user and the direction of printing is executed by the computer, the printer driver 103 executes the following processing. That is, the printer driver 103 inquires to a command interpretation section (not shown) of printer 1500 with regard to form data stored in the hard disk 8, and acquires the file name and the stored date of the form data. The acquired file name and stored date of the form data are displayed on a field 201.

In addition, in the present embodiment, "form" is an image to be combined with (overlaid on) contents data, and it includes figures, characters, or numbers.

Figure 4:
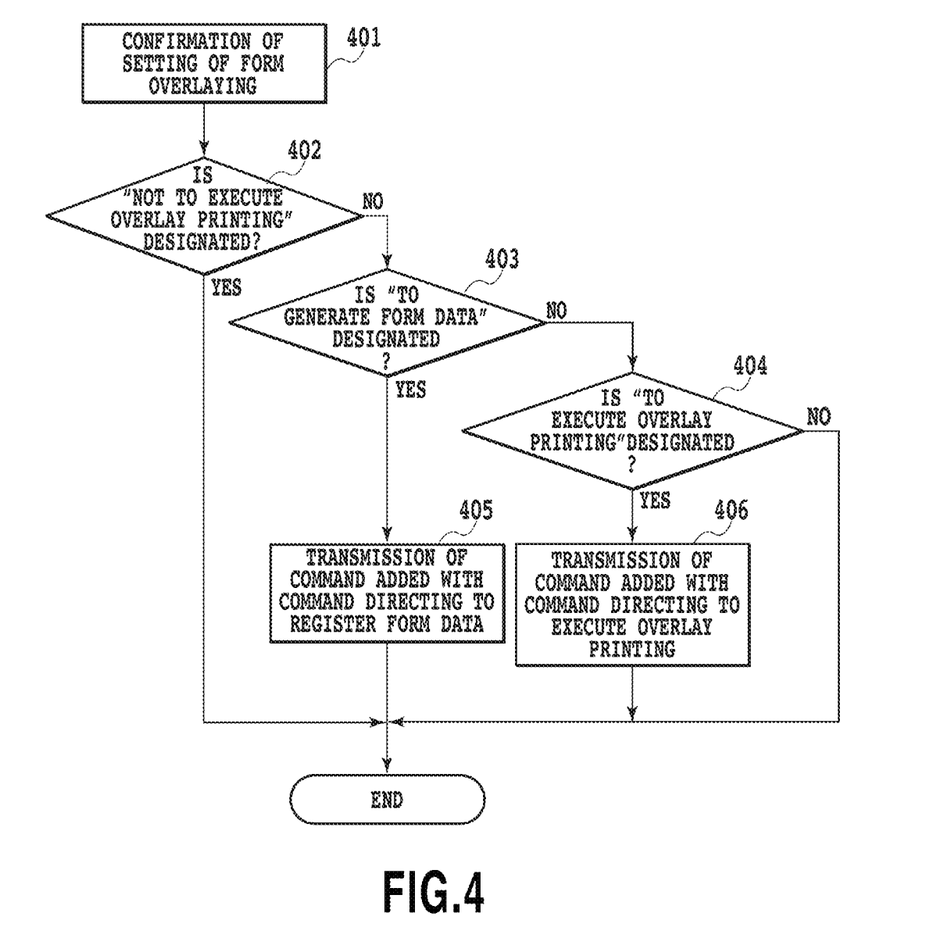
FIG. 4 is a flowchart illustrating processing at a printer driver side during the execution of overlay printing according to an embodiment of the present invention.

FIG. 4 is a flowchart exemplifying a case of processing for the printer driver 103 executing overlay printing after the printer driver 103 receives a print command from a graphic engine 102.

At step 401, the printer driver 103 acquires the setting designated by a user through the interface illustrated in FIG. 2. With regard to the acquired setting, it is either one of a processing method of overlaying, the file name and stored date of form data which are stored in the hard disc 8 of printer 1500, or the file name of form data to be generated, or suitable combination thereof.

For example, when a user selects a mode of "not to execute overlay printing" through the input operating section, the printer driver 103 acquires a user's input indicating not to execute overlay printing, as a method for overlay processing. Moreover, when the user selects a mode of "to generate a form file (form data)" through the input operating section, the printer driver 103 acquires a user's input indicating to generate form data. At that time, the printer driver 103, acquires the file name of form data to be generated, being input by the user through the input operating section, as well as the user's input. Further, when the user selects a mode of "to execute overlay printing" through the input operating section, the printer driver 103 acquires a user's input indicating to execute overlay printing. At that time, the printer driver 103, inquires to the hard disk 8 of the printer as mentioned above to acquire the file name and the stored date of the form data stored on the hard disk 8, as well as the user's input.

In addition, when the mode of "to generate a form file" is selected, the printer driver 103 indicates the interface illustrated in FIG. 3 on the display section, and causes the user to input the file name of form data of which generation is wanted by the user. The file name input in such a manner becomes to the above-mentioned "file name of the form data to be generated". Moreover, the printer driver 103 acquires image data (image data to be form data) corresponding to the input file name from a predetermined memory.

Moreover, when the user selects the mode of "to execute overlay printing", the user selects the file name of desired form data from the field 201 of the interface illustrated in FIG. 2 through the input operating section. Then, based on the user's input by the selection, the printer driver 103 acquires the file name and the stored date of the selected form data.

At steps 402, 403 and 404, the printer driver 103 determines whether the mode of the designated setting (user's input) of overlaying is anyone of modes of "not to execute overlay printing", "to execute overlay printing", and "to generate form data".

That is, at step 402, the printer driver 103 determines whether the user's input acquired at step 401 is a mode indicating "not to execute overlay printing". When the printer driver 103 determines that the mode is a mode of "not to execute overlay printing", the processing is completed directly, and when the printer driver 103 do not determine that the mode is a mode of "not to execute overlay printing", the processing advances to step 403.

At step 403, the printer driver 103 determines whether the user's input acquired at step 401 is the mode of "to generate form data". When the printer driver 103 does not determine that the mode is a mode of "to generate form data", the processing advances to step 404.

When the printer driver acquires the setting mode of "to generate form data", at step 405, the printer driver 103 generates a predetermined printer control command, and transmits the command to the printer 1500. The predetermined printer control command includes the file name of the form data designated in form 301 of FIG. 3 (acquired at step 401), and a command directing to register the form data. Further, the printer control command includes "image data to be form data" that is an image data corresponding to the file name.

The control software 15 in the printer 1500 receives the printer control command received, and interprets the printer control command. After that, the control software 15 executes the below described processing illustrated in FIG. 5.

At step 404, the printer driver 103 determines whether the user's input acquired at step 401 is a mode indicating "to execute overlay printing". When the printer driver 103 does not determine that the user's input is the mode indicating "to execute overlay printing", it completes processing directly.

When the printer driver 103 acquires the setting mode of "to execute overlay printing", at step 406, it generates a predetermined printer control command and transmits it to the printer 1500. The predetermined printer control command includes a command indicating the "file name" and the "stored date" of form data designated by a user from the area 201 in FIG. 2, and direction "to execute overlay printing". Further, the printer control command also includes contents data. The contents data is data that is combination of pieces of form data to be printed.

The control software 15 receives the printer control command, and interprets the printer control command. After that, it executes below described processing illustrated in FIG. 5.

Figure 5:
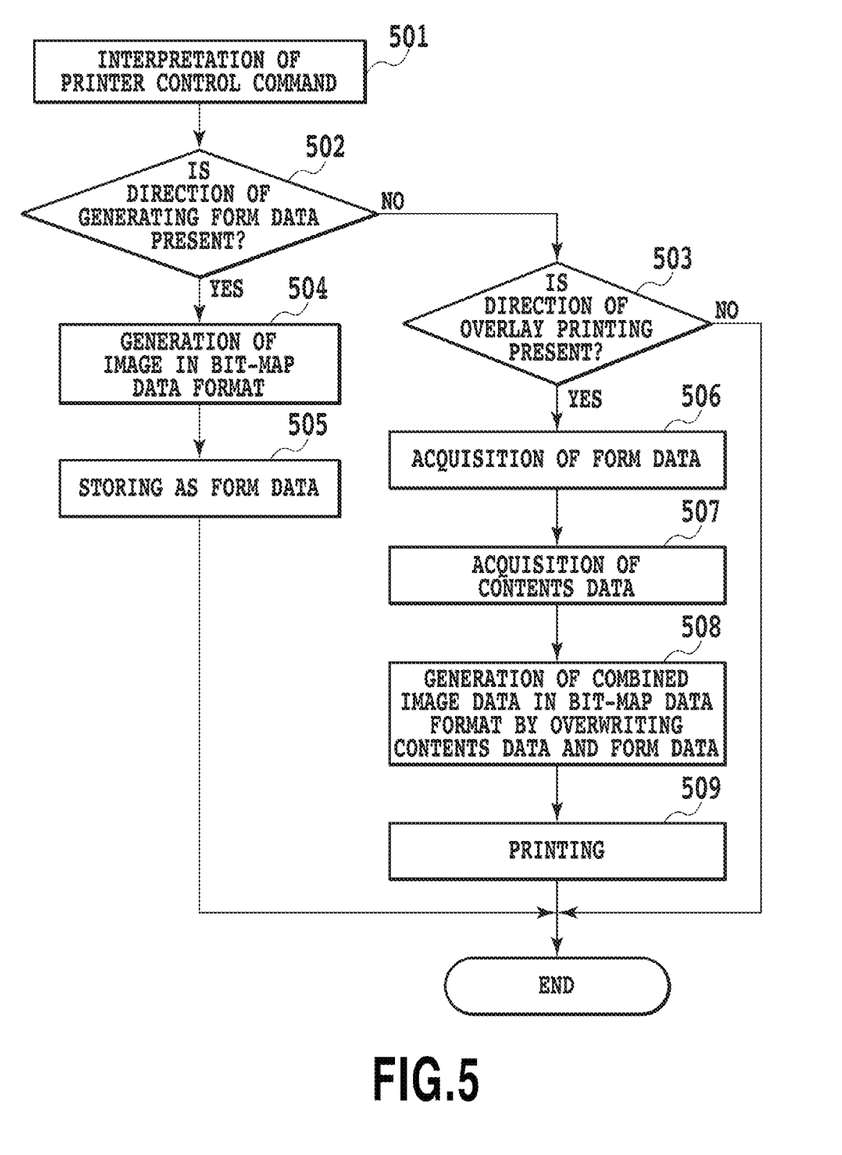
FIG. 5 is a flowchart illustrating processing at a control software side during the execution of overlay printing according to an embodiment of the present invention.

FIG. 5 is a flowchart describing one example in which the operation of the control software 15 is described, when it receives a printer control command including a command directing to register form data or a command directing to execute overlay printing.

At step 501, the control software 15 interprets the received printer control command in the control software 15.

At steps 502 and 503, the control software 15, based on its interpretation result at step 501, determines whether the printer control command includes a command directing to execute overlay printing or a command directing to register form data.

That is, at step 502, the control software 15, based on its interpretation result at step 501, determines whether a direction regarding "to register form data" from the printer driver 103 is present. When the control software 15 determines that the direction is not "to register form data", it advances to step 503. On the contrary, when the control software 15 determines that the direction is "to register form data", it generates form data, determines to register the form data on the hard disk 8, and advances to step 504.

When the printer control command includes a command directing to register form data, at step 504, the control software 15 generates form data in bit-map data format. That is, the control software 15, by transforming image data to be form data, included in the printer control command transmitted from the printer driver 103, generates the form data in bit-map data format.

At step 505, the control software 15 stores the form data in bit-map data format generated at step 504 on the hard disk 8 (registers the data as form data).

At step 503, the control software 15, based on its interpretation result at step 501, determines whether the direction from the printer driver 103 is "to execute overlay printing". When the control software 15 determines that the direction from the printer driver 103 is "not to execute overlay printing", it completes its processing directly.

When the printer control command includes a command directing to execute overly printing, at step 506, the control software 15 acquires corresponding form data stored on the hard disk 8. That is, the control software 15, based on the command included in the printer control command received, indicating the "file name" and the "stored date" of form data designated by a user, extracts the form data designated by the user from the hard disk 8.

At step 507, the control software 15 takes out contents data to be combined with the form data, from the printer control command received, and transmits it to the rendering section 16. The rendering section 16 transforms the contents data into contents data in bit-map data format, and transmits it to the image processing section 17. After being subjected to image processing by the image processing section 17, the contents data in bit-map data format is transmitted to the control software 15.

At step 508, the control software 15 overwrites the form data in bit-map data format acquired at step 506, and the contents data in bit-map data format received from the image processing section 17. That is, the control software 15 acts as a combination section, and by overlaying (combining) the form data and the contents data, generates combined image data in bit-map data format.

The printer 1500, transmits the combined image data in bit-map data format generated at step 508 to a printing section 11 to realize an overlay printing function.

Next, a normal-color stamp printing function of the print control system illustrated in FIG. 1 will be described. Thus, in the present embodiment (including the following embodiments), although a case in which a stamp is used as additional information, is exemplified, the applicable scope of the present embodiment is not limited to the stamp. Instead, the present embodiment is applicable to whole of "technologies in which additional information can be printed", and an example of additional information includes a copy-forgery-inhibited pattern image, barcode, two-dimensional code (such as glyph code, dot code, or QR (trade mark) code), see-through pattern, or watermark. In addition, additional information (additional data) is information other than information (also referred to as contents data) for which a user explicitly gives direction of printing.

Figure 6:
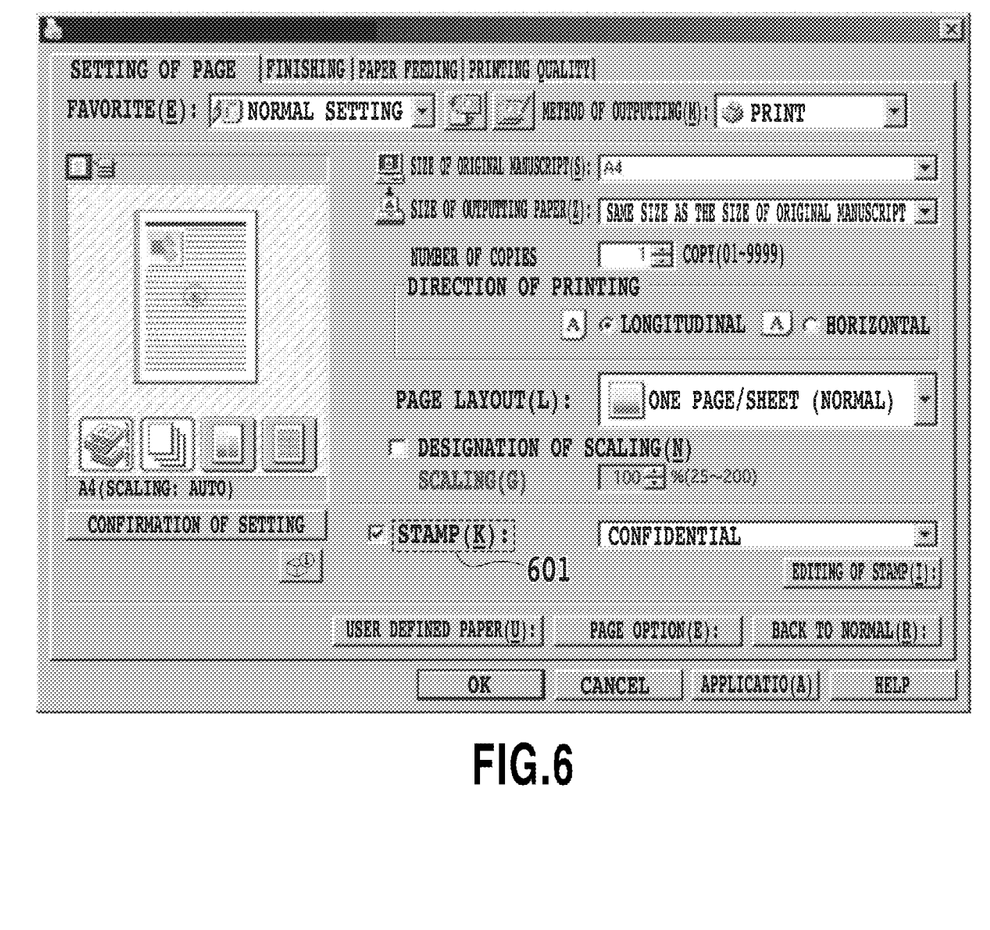
FIG. 6 is an exemplary view of an interface through which stamp layout is designated, according to an embodiment of the present invention.

With reference to FIG. 6, an example of an interface screen displayed on the display section of the computer 3000, for designating whether printing of document is accompanied with printing of a stamp, is illustrated.

Figure 7:
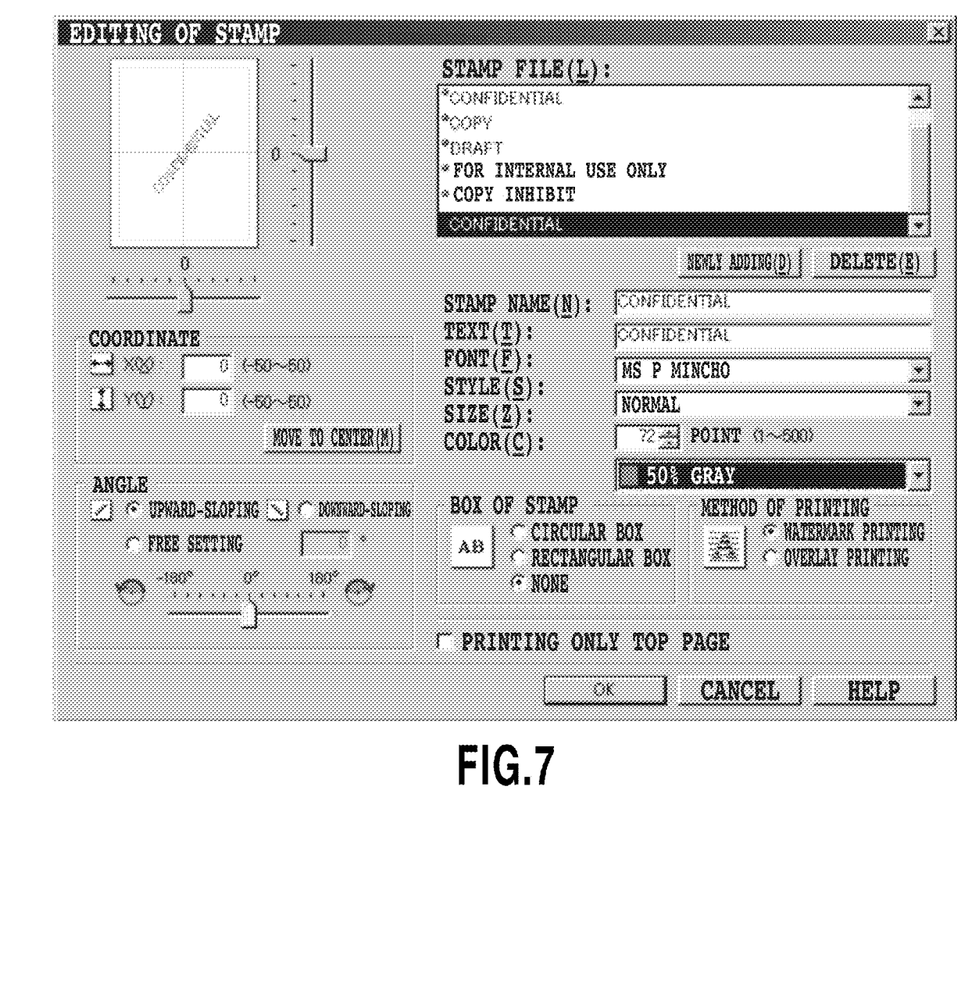
FIG. 7 an exemplary view of an interface through which setting of stamp designation is executed, according to an embodiment of the present invention.

Moreover, with reference to FIG. 7, an example of an interface screen displayed on the display section of the computer 3000, for designating the layout of a stamp when adding the stamp to contents data, is illustrated.

Through the interface in FIG. 6, a user can designate the printer driver 103 to execute printing of contents data accompanied with printing of a stamp. That is, user's check of a check box 601 by operating the input operating section of the computer 3000 causes the computer 3000 to receive the direction of stamp printing designation.

Through the interface in FIG. 7, a user can designate the layout information of a stamp to the control software 15. Examples of the layout information include the color of the stamp, character string, font information (name, style and size of a font) of the character string, rectangular or circular box frame as decoration, and coordinate or angle of the stamp. That is, the layout information is information with regard to additional information (additional data). Among the pieces of layout information, if a T color is selected as the color of the stamp, the additional information will be T data.

Figure 8:
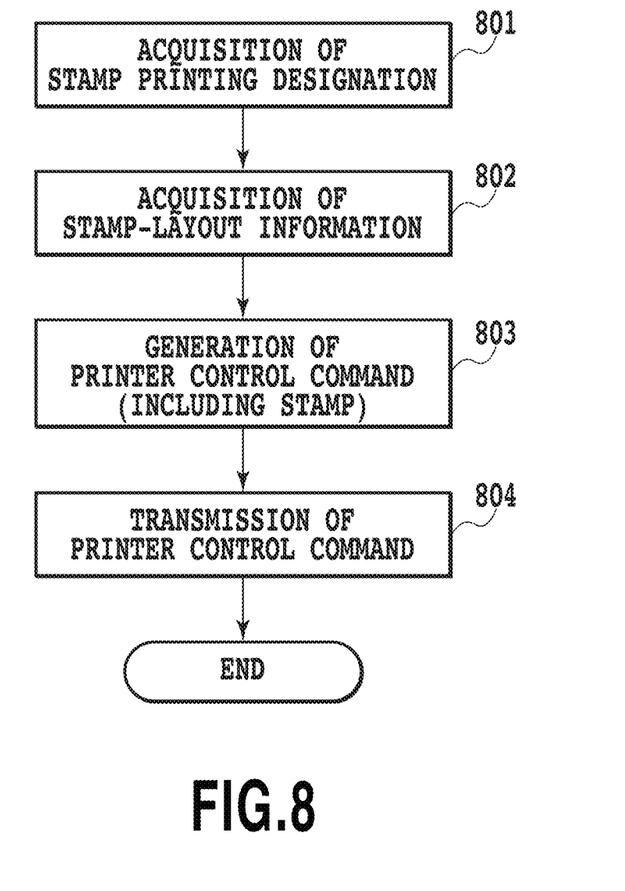
FIG. 8 is a flowchart illustrating processing at a printer driver side during the execution of normal-color stamp printing according to an embodiment of the present invention.

FIG. 8 is a flowchart illustrating processing in which the printer driver 103 receives contents data from the graphic engine 102, overwrites a normal-color stamp on the contents data to combine them, and prints the combined contents data. In addition, the normal-color stamp is designated as a stamp, that is additional information, having a normal color (RGK, or YMCK) other than a T color.

At step 801, the printer driver 103 acquires setting designated by a user through the interface illustrated in FIG. 6. The setting to be acquired is direction of stamp printing. That is, if a user operates the input operating section to check the check box 601, stamp printing would be designated by the user, thereby, the printer driver 103 acquires direction of stamp printing from the user's input.

After acquiring setting of direction of stamp printing (setting indicating that stamp printing is designated), at step 802, the printer driver 103 acquires the setting designated by a user through the interface illustrated in FIG. 7. The setting to be acquitted is the layout information of a stamp such as the color of the stamp, character string, font information (name, style and size of a font) of the character string, rectangular or circular box frame as decoration, and coordinate or angle of the stamp. That is, if a user operates the input operating section to input setting as desired on a given column of the interface illustrated in FIG. 7, the layout information would be input by the user, thereby, the printer driver 103 acquires the layout information from the user's input.

Here, since, when inputting the layout information, the user selects a color other than a "T color" as the color of the stamp, the printer driver 103 would generate a printer control command for directing the printer 1500 to perform normal-color stamping.

At step 803, the printer driver 103 determines the color of the stamp, that is additional data, from the layout information acquired at step 802. At that time, since the color of the stamp is a color other than a T color, the printer driver 103 determines that the color of the stamp is not a T color. Next, the printer driver 103 generates a printer control command for directing to overwrite the stamp of which setting is acquired at step 802 on contents data (for directing to execute overlay printing). At that time, since the stamp is a normal-color stamp, its color is designated in RGB or CMYK data format from the acquired color setting of the stamp. Moreover, between steps 802 and 803, the printer driver 203 executes format conversion of the contents data. That is, it converts the contents data received from the graphic engine 102 into a format (PDL format) suitable for the printer control command.

At step 804, the printer driver 103 transmits the printer control command generated at step 803 to the printer 1500 via the system spooler 104. At that time, the transmitted printer control command includes: layout information of a stamp designated in RGB or CMYK data format as additional information; a command for directing to execute overlay printing; and contents data.

The processing in the printer 1500 after step 805 includes the following steps that are different from the steps illustrated in FIG. 5.

The control software 15 in the printer 1500 receives the printer control command received, and interprets it. That is, the control software 15 interprets the printer control command in PDL format to obtain a command in display-list format. After that, the control software 15 transmits the data (the command in display list format) obtained by interpreting the printer control command to the rendering section 16. The rendering section 16 generates image data (combined image data) in bit-map data format from the command received.

Specifically, the rendering section 16, by rendering contents data using the command (a command regarding to the contents data in the command) in display list format, generates contents data in bit-map data format. Further, the rendering section 16, using the command (a command regarding to the stamp in the command) in display list format, renders the contents data. At that time, using the command (a command regarding to the stamp in the command), the rendering section 16 renders the generated contents data in bit-map data format. Thus, a stamp in bit-map data format would be combined, that is, overlaid on the contents data in bit-map data format.

Further, the rendering section 16 transmits the image data (combined image data) in bit-map data format obtained by overwriting and combining to the image processing section 17 as RGB data. The image processing section 17 subjects the image data in bit-map data format to image processing, and then sends the processed data to the print section 11. Thus, after step 805, the above-mentioned processing (combination processing by the rendering section 16) is performed.

According to the above-mentioned flow, the printer 1500 realizes the normal-color stamp printing function.

Figure 9:
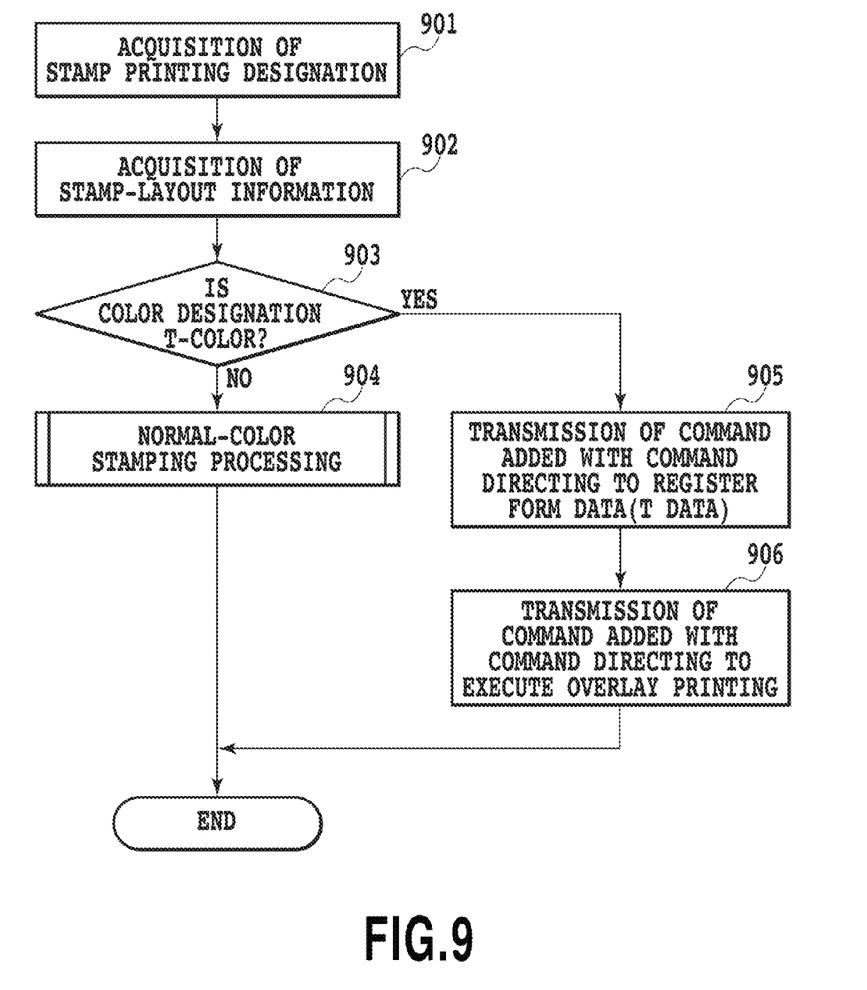
FIG. 9 is a flowchart illustrating an operation for switching between a normal-color stamp printing and a T-color stamp printing according to an embodiment of the present invention.

FIG. 9 is a flowchart illustrating processing in which the printer driver 103, having received contents data from the graphic engine 102, overwrites and combines a normal-color or T-color stamp on and to the contents data, and prints the combined contents data. In addition, the printer driver for executing the processing in FIG. 9 is the same as the printer driver for executing the processing in FIGS. 4 and 5. That is, the printer driver for executing the processing in FIGS. 4 and 5 also executes the processing in FIG. 9.

At step 901, the printer driver 103, in the same manner as at step 801, acquires the setting designated by a user through the interface illustrated in FIG. 6. The acquired setting is designation of stamp printing.

At step 902, the printer driver 103, in the same manner as at step 802, acquires the setting designated by a user through the interface illustrated in FIG. 7. The acquired setting is layout information of a stamp such as the color of the stamp, character (letter) string, font information (name, style and size of a font) of the character (letter) string, rectangular or circular box frame as decoration, and coordinate or angle of the stamp.

At step 903, the printer driver 103, from the layout information obtained at step 902, determines whether the color of the stamp is a T color (T data). That is, at step 903, the printer driver 103 acts as a determination unit for determining whether the color of the stamp is a T color.

If, the color of the stamp acquitted at step 902 is not a T color, at step 904, the printer driver 103 executes the procedure (normal-color stamping) at step 803 and 804 in FIG. 8. After the procedure at step 805, the same processing as the processing described after the description of FIG. 8 (combining processing by the rendering section 16) is performed by the printer 1500.

This is because, if the color of the stamp is not a T color, the data can be dealt with in RGB or CMYK format, in this case, normal-color stamping is executed. In the normal-color stamping, it is possible for the rendering section 16 and the image processing section 17 to deal the contents data and the command regarding to the stamp as one piece of data.

If, the color of the stamp acquired at step 902 is a T color, at the flow after step 905, the printer driver 103 transmits a printer control command to combine the T-color stamp and contents data using the overlay printing function, to the printer 1500.

Although the color of the stamp is a T color, the rendering section 16 and the image processing section 17 of this print control system deal only RGB or CMYK data. For this reason, by executing overlay printing using the RGB or CMYK contents data and the command regarding to RGB or CMYK color stamp including information regarding to a T-color stamp, a T-color stamp printing function is realized.

At step 905, based on the results acquired at steps 901 and 902, the printer driver 103 generates a first printer command and transmits it to the printer 1500. The first printer control command includes an arbitrary "file name" for discriminating a stamp to be combined. The arbitrary filename may be generated automatically after the printer driver 103 acquired the layout information at step 902. Moreover, at a time of user's input at the interface illustrated in FIG. 7, a file name corresponding to the layout information (stamp) selected by a user may be input by the user. In this case, the file name input by the user is the "arbitrary file name". Moreover, the first printer control command includes a command for directing to register form data, and a command for indicating that the form data is T data. The first printer control command further includes a command for indicating rendering of a stamp using the layout information of the stamp acquired at step 902, that is image data to be form data.

If the printer 1500 receives the first printer control command, the control software 15 executes the same processing as at steps 502, 504 and 505 shown in FIG. 5 and executes registration of form data. The control software 15, when registering the form data on the hard disk 8, registers image data (stamp) to be the form data included in the first printer control command as form data using the arbitrary file name. Further, the control software 15, during the registering processing, registers the form data as T data, based on a command included in the first printer control command, indicating that the form data is T data. Thus, on the hard disk 8, form data which is identified by the arbitrary file name, and is managed as T data, would be held. That is, the control software 15 stores the form data on the hard disk 8 by associating that the form data is T data.

As described-above, according to the present embodiment, if the color of a stamp, that is additional data, is T color, first, the stamp is held in advance at the side of the printer 1500 as form data, and the printer 1500 is caused to recognize that the held form data is T data. For this purpose, the printer driver 103 transmits additional information having a T color as form data, as well as a command indicating that the form data is additional information having a T color, to the printer 1500.

At step 906, the printer driver 103, based on the result acquired at steps 901 and 902, generates a second printer command, and transmits it to the printer 1500. The second printer command includes a command for directing the printer 1500 to execute overlay printing. Moreover, the second printer command includes the "file name (the arbitrary file name)" of the form data transmitted at step 905 and a command indicating printing of contents data, that are pieces of contents data.

The control software 15 in the printer 1500, receives a printer control command received, and interprets the printer control command. After that, according to the flow in FIG. 5, the software 15 executes processing of overlay printing.

Since the printer control command generated by the printer driver 103 at step 905 includes a command indicating that form data has a T color, at step 508, the control software 15 generates image data combined with a T-color stamp. The printer 1500, by sending the generated combined image to the printing section 11, realizes a T-color stamp printing function.

That is, the printer 1500, by combining the form data held on the hard disk 8 and the contents data in a manner that the stamp, i.e. form data, is output (printed) as a T-color stamp, generates image data combined with the T-color stamp, and outputs (prints) the data.

As mentioned above, according to the present embodiment, a printer driver determines the color of additional information, and generates two different printer control commands for cases when the color is a T color (T data), and when the color is a normal color other than a T color. A printer, by operating according to the printer control command in case when the color of additional information is a T color, can output combined data of T data and contents data. Moreover, the printer, by operating according to the printer control command in case when the color of additional information is a normal color other than a T color, can output combined data of normal-color additional information and contents data. That is, the printer, without determining whether the additional information is a T color, can switch between normal printing and printing using a transparent toner or transparent ink.

According to the present invention, it is important that when the printer interprets the printer control command sent from a printer driver, the device switches its processing to processing for dealing with T data. That is, it is important that, by merely following the received printer control command, the printer can deal with T data, without performing processing such as determination whether the sent additional information is T data, or determination of operation when the additional information is T data.

For this purpose, according to the present embodiment, the printer driver, as at step 905, transmits T-color additional information (T data) as form data and a command indicating that the color of the additional information is a T color, to the printer. Upon reception of such a command, the printer can hold the form data as form data having a T color. That is, without determining whether the color of the sent additional information is a T color, the printer can recognize that the color of the sent additional information is a T color by the command sent from the printer driver.

Thus, upon reception of a printer control command like the command transmitted at step 906, including a command to execute overlay printing using the form data, the printer can switch its processing for processing T data to execute overlay processing (combination processing). That is, since already recognized that the form data is T data, the printer can switch its processing to processing as illustrated in FIG. 5 without determining whether the form data is T data, during overlaying processing.

In addition, although in the above-mentioned description, an embodiment in which form data is not used in normal-color stamping, is described, the present invention is not limited to this. The essence of the present invention is that, when additional information is T data, by merely providing a direction command from the printer driver, additional information, that is T data, is output without determining whether the additional information of which color is to be determined, and which is to be combined, is T data, in the printer. Accordingly, with regard to normal-color stamping, form data may be used without specific limitation.

Another Embodiment

The present invention is applicable to a system composed of a plurality of devices (such as a computer, an interface device, a reader, and a printer), and is also applicable to an apparatus composed of one device (such as a compound machine, a printer, or a facsimile machine).

A processing method including steps of: storing a program for operating components of the above-mentioned embodiment on a storage medium so as to realize the function of the embodiment; reading the program stored in the storage medium as a code; and causing a computer to execute the code, is also included within the scope of the embodiment. That is, a computer readable storage medium is also included within the scope of the embodiment. Moreover, not only the storage medium on which the computer program is stored, but also the computer program itself are included within the scope of the embodiment.

Examples of such a storage medium include a floppy (registered mark) disk, a hard disk, an optical disk, a magneto-optical disk, a CD-ROM, a magnetic tape, a nonvolatile memory card, and a ROM.

Moreover, not only a single program stored on the above-mentioned storage medium, for executing processing by itself, but also a program operating on an OS while cooperating with other software and the function of an expansion board, for executing the operation of the embodiment, are included within the scope of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-27698, filed Feb. 7, 2008 which is hereby incorporated by reference herein in its entirety.

What is claimed is:

1. An information processing apparatus comprising:
a switching unit configured to switch, through a setting screen, between a setting to output additional image data with a selected color of a plurality of colors and a setting to output additional image data with a transparent color using transparent color material, wherein the additional image data is to be superimposed on content data to be output; and
a transmitting unit configured to,
in a case where the switching unit switches to the setting to output additional image data with a transparent color using transparent color material, transmit the additional image data and a first command for the additional image data to be output by using the transparent color material to an image forming apparatus capable of connecting to the information processing apparatus, and to thereafter transmit, to the image forming apparatus, the content data that is different data from the additional image data and a second command for the content data that is to be combined with the additional image data at the image forming apparatus and the combined content data on which the additional image data with transparent color is to be superimposed is to be output, and in a case where the switching unit switches to the setting to output additional image data with a selected color of a plurality of colors, transmit additional image data and the content data each designated in RGB or CMYK data format and a third command for the content data that is to be combined with the additional image data in bitmap format and the combined content data on which the additional image data is to be superimposed is to be output;

wherein the first command transmitted by the transmitting unit is generated by the information processing apparatus in a case where a color of the additional image data is determined to be transparent by the information processing apparatus, and the image forming apparatus identifies the color of the additional image data in accordance with the transmitted first command without determining whether the color of the additional image data is transparent or not.

2. The information processing apparatus according to claim 1, in the case where the switching unit switches to the setting to output additional image data with the transparent color using transparent color material, wherein the additional image data is generated as form data in order to add the additional image data to the content data, and wherein the additional image data output with a transparent color using transparent color material is added to the content data by combining the form data and the content data at the image forming apparatus capable of connecting to the information processing apparatus.

3. The information processing apparatus according to claim 1, in the case where the switching unit switches to the setting to output additional image data with the selected color of the plurality of colors, wherein the additional image data is a stamp image, and the stamp image is to be superimposed on the content data to be output.

4. A control method of an information processing apparatus, the control method comprising the steps of:

switching, through a setting screen, between a setting to output additional image data with a selected color of a plurality of colors and a setting to output additional image data with a transparent color using transparent color material, wherein the additional image data is to be superimposed on content data to be output; and transmitting, in a case where the switching step switches to the setting to output additional image data with a transparent color using transparent color material, the additional image data and a first command for the additional image data to be output by using the transparent color material to an image forming apparatus capable of connecting to the information processing apparatus, and thereafter transmitting, to the image form apparatus, the content data that is different data from the additional image data and a second command for the content data is to be combined with the additional image data at the image forming apparatus and the combined content data on which the additional image data with transparent color is to be superimposed is to be output, and in a case where the switching unit switches to the setting to output additional image data with a selected color of a plurality of colors, transmitting additional image data and the content data each designated in RGB or CMYK data format and a third command for the content data that is to be combined with the additional image data in bitmap format and the combined content data on which the additional image data is to be superimposed is to be output;

wherein the first command transmitted in the transmitting step is generated by the information processing apparatus in a case where a color of the additional image data is determined to be transparent by the information processing apparatus, and the image forming apparatus identifies the color of the additional image data in accordance with the transmitted first command without determining whether the color of the additional image data is transparent or not.

5. The control method according to claim 4, in the case where the switching unit switches to the setting to output additional image data with the transparent color using transparent color material, wherein the additional image data is generated as form data in order to add the additional image data to the content data, and wherein the additional image data output with a transparent color using transparent color material is added to the content data by combining the form data and the content data at the image forming apparatus capable of connecting to the information processing apparatus.

6. The control method according to claim 4, in the case where the switching unit switches to the setting to output additional image data with the selected color of the plurality of colors, wherein the additional image data is a stamp image, and the stamp image is to be superimposed on the content data to be output.

7. A non-transitory computer readable storage medium storing a program, the program causing a computer to execute the control method according to claim 4.

* * * * *